ELECTRICAL OSCILLATION GENERATOR

Filed Sept. 7, 1946 2 SHEETS—SHEET 1

INVENTORS
NOEL M. RUST
GEORGE E. PARTINGTON
DONALD L. PLAISTOWE
& DAVID J. FEWINGS
BY H. S. Grover
ATTORNEY INVENTORS
NOEL M. RUST
GEORGE E. PARTINGTON
DONALD L. PLAISTOWE
& DAVID J. FEWINGS
BY H. S. Grover
ATTORNEY Patented Nov. 18, 1952 2,618,748

UNITED STATES PATENT OFFICE 2,618,748

ELECTRICAL OSCILLATION GENERATOR

Noël Meyer Rust, Danbury Common, Chelmsford, George Earnshaw Partington, Langdale, Westmorland, and Donald Leopold Plaistowe and David John Fewings, Chelmsford, England, assignors to Radio Corporation of America, a corporation of Delaware Application September 7, 1946, Serial No. 695,532
In Great Britain February 4, 1941

Section 1, Public Law 690, August 8, 1946
Patent expires February 4, 1961

18 Claims. (Cl. 250—36)

The present invention relates to oscillation generator circuit arrangements, and particularly to circuit arrangements for generating pulses of high, or ultra-high frequency oscillations. Broadly stated, two oscillator circuits, one a radio frequency circuit and the other a pulse or quench frequency circuit, are operated by a single valve.

According to the invention, in oscillation generator circuits for producing grouped pulses of radio frequency energy, the anode/cathode circuit of a thermionic valve or electron discharge device is back-coupled to the grid/cathode circuit by means including a transformer having tight couplings between its primary and secondary windings; or, if the transformer is an auto-transformer, between two parts of its winding.

The radio frequency oscillator circuit may be any of the usual known oscillator circuits suitable for the radio frequency required, and for ultra high frequencies will usually consist of "line" oscillator circuits. In the pulse oscillator circuit, the valve is back-coupled to a much greater degree than is necessary to sustain oscillations whereby it is caused to charge up a condenser which is associated with the grid circuit and may be connected across the grid/cathode space so that the grid becomes biased and the valve blocked until the charge on the condenser shall have dissipated, whereupon oscillation generation recommences. The frequency at which pulses are generated is controlled, mainly by this condenser and its associated resistance.

Back coupling for the pulse oscillator circuit may be effected by a transformer in the anode or cathode circuit feeding back to the grid. The transformer, which must have tight coupling and low self-capacity, can be either air or iron cored and should be damped. Usually an iron core gives sufficient damping. Resistors across the windings can be used for air cored transformers. The resonant frequency of the transformer must be well above the pulse frequency.

The resistance capacity circuit for producing the blocking action may be in either the cathode or grid circuits. Radio frequency chokes are inserted between the components comprising the pulse circuit and the valve. These prevent bypassing of the radio frequency. Normally either the cathode or anode is at earth potential as regards radio frequency so that often only two chokes are required. At ultra high frequency it will usually be found necessary to use either chokes or tuned lines in all connections between the valve and pulse circuit.

The invention is applicable to a transmitter circuit, a super-regenerative receiver circuit, or a circuit which can be used either as a transmitter or receiver (so-called "trans-receiver" circuit), two such circuits forming an efficient "trans-receiver" system.

The invention is illustrated in the accompanying drawings.

Figures 1, 2, 3:
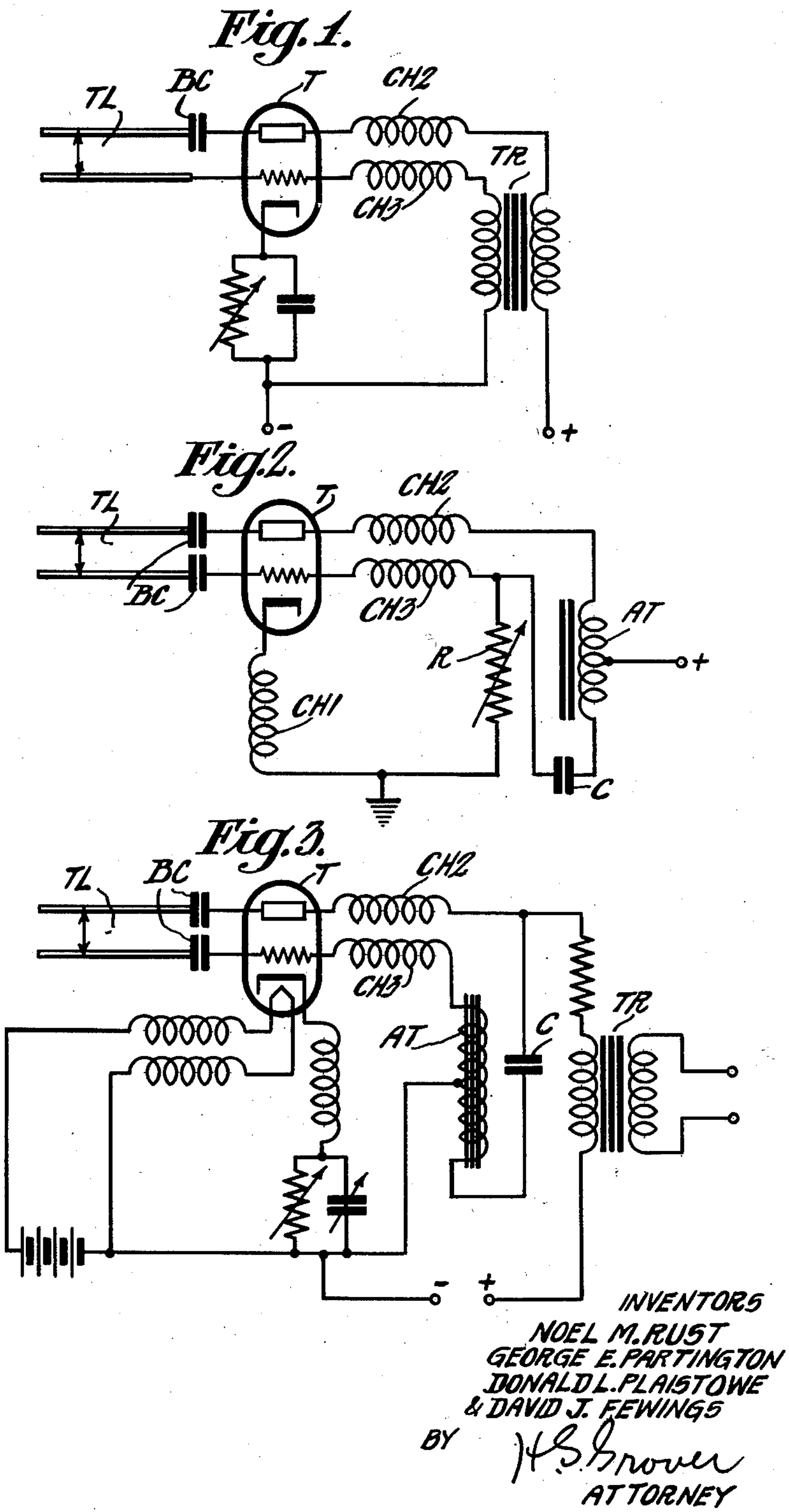

In one circuit arrangement in accordance with the invention illustrated in Fig. 1, a radio frequency tuned circuit TL, comprising a condenser and inductance in parallel, or as shown parallel rods with an adjustable slider, is connected between the anode and grid of a triode T, the cathode of which is connected to earth through a parallel connected resistance and condenser. The anode of the valve is connected to the positive terminal of a source of anode potential energy, the negative terminal of which is earthed. This connection is effected through the primary winding of a transformer TR and a radio frequency choke CH2. The grid of the valve is connected to earth through the secondary winding of the transformer and a second radio frequency choke CH3. The two radio frequency chokes are situated between the anode, or grid, and the primary winding, or secondary winding, as the case may be. A blocking condenser BC is included between the anode of the valve and that end of the radio frequency tuned circuit which is connected thereto.

In another circuit arrangement in accordance with the invention (illustrated in Fig. 2), a tuned line circuit TL, comprising a pair of copper rods with an adjustable slider, is connected between the anode and grid of a triode T, the internal capacity of which is such as to permit of ultra high frequency working. The cathode of the triode is connected to earth through a radio frequency choke CH1. The anode of the triode is connected through a radio frequency choke CH2 to one end of an auto-transformer AT, the other end of which is connected through a condenser C and resistance R to earth. Anode potential is applied to a tapping point on the auto-transformer. The junction point of the condenser and resistance is connected to the grid of the triode through a radio frequency choke CH3. Blocking condensers BC are included between the tuned line circuit and the anode and grid of the triode.

In a further circuit arrangement in accordance with the invention, which arrangement (illustrated in Fig. 6) is generally similar to the arrangement of Fig. 2, a triode T, the internal capacity of which is sufficiently low for ultra short wave working, has connected to its grid and anode a tuned circuit TL comprising a pair of copper rods bridged at the remote end by a variable tuning condenser VC, instead of the adjustable slider shown in Fig. 2, which condenser is adjusted to have a value approximately equal to the anode/grid capacity of the valve and the lengths of the copper tubes of the tuned line circuit TL are adjusted so that the whole circuit resonates at the desired ultra high frequency. The cathode of the triode is connected to earth through a radio frequency choke (as shown) or if desired by a resistance and condenser in parallel (as shown in Fig. 1). The rest of the circuit is similar to that just described in connection with Fig. 2, except that the center point of that rod which is connected to the anode is connected to one end of the auto-transformer AT, and the junction point of the condenser C and resistance R is connected to the center point of the other rod. Blocking condensers are not required in this circuit.

Many modifications of the circuit arrangements are possible. Thus the tuned circuits TL of any of the arrangements may, as has been stated for the arrangement of Fig. 1, consist of a condenser and inductance in parallel, or it may take the form shown in Figs. 1–5, or it may take the form shown in Fig. 6.

Figures 4, 5, 6:
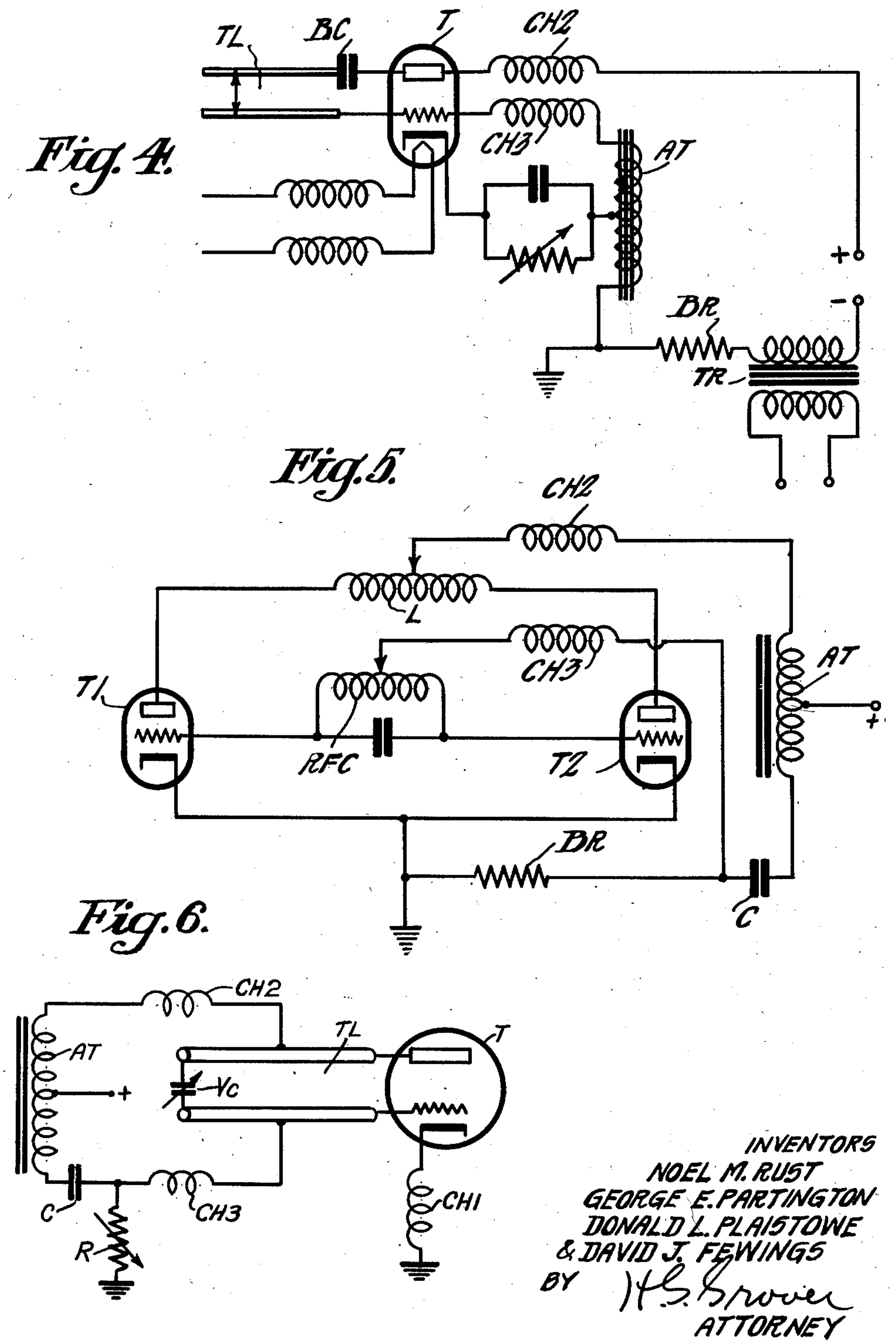

Again, as illustrated in Fig. 5, a pair of triodes T1 and T2 may have their grids connected respectively one to one end and the other to the other end of a radio frequency tuned circuit RFC, their anodes being connected together through an inductance L and their cathodes being connected together and to earth. The center point of the inductance element of the radio frequency tuned circuit is connected through a radio frequency choke CH3 and a condenser C to one end of an auto-transformer AT, the other end of which is connected through a radio frequency choke CH2 to the center point of the inductance L connecting the anodes. A resistance BR is connected at one end to the junction point of the radio frequency choke CH3 with the condenser C, and at the other end to earth. Anode potential is applied to a tapping point on the auto-transformer.

Where the oscillation generator circuit arrangement of the present invention is used as part of a pulse transmitter, modulation of the trains of pulses of radio frequency energy may be effected by modulating by means of a transformer TR the anode supply voltage in conventional manner, as illustrated in Fig. 3. With a similar circuit for the receiver, the pulse frequencies will lock and demodulation takes place in the normal way of a super-regenerative detector. Apart from the addition of transformer TR for modulating the anode current, the arrangement of Fig. 3 is very similar to that of Fig. 2. The mid-point of the auto-transformer is connected to the negative (earthed) terminal of the high tension supply with the consequence that a blocking condenser is required between the anode of valve T and the auto-transformer instead of between the grid and the auto-transformer.

If the modulation is applied, as illustrated in Fig. 4, in seires with the blocking resistance BR, then the amplitude modulation will be very small but there will be a large frequency modulation of the pulse frequency.

With a similar circuit for reception, the pulse frequency is entrained and demodulation occurs, since the mean feed to the valve is a function of the pulse frequency.

When used as super-regenerative receivers, the output can be taken from the anode, cathode or even grid circuits, usually through a low pass filter with low input impedance at the pulse frequency.

The receiving adjustments are necessarily different from those required for a transmitter working on the same basic circuit.

The slope of the entering edge of the receiver wave and the wave form at decay need not be so steep as in the transmitter case. This is obvious for known reasons in the art of super-regeneration. The high tension voltage will ordinarily be lower for example as it is not required to swing the valve to limit.

Since it is found that a receiver employing a pulse oscillation generator (according to the invention) will entrain itself to the pulses of a transmitter employing a pulse oscillation generator (according to the invention), two such stations each adapted to operate either as a transmitter or receiver may be employed to constitute a complete radio communication system. Here the principal requirement in changing from transmission to reception is to reduce the high tension voltage at the plate by inserting a resistance in series, though for short distance communication change of adjustments is unnecessary. This is convenient when receiving normal modulated C. W. for example.

With suitable precautions to avoid dead-end effects of idle parts of the tuning circuit due to the ultra high frequency line system, the circuit can easily be made to super-regenerate from 60–150 cms. By careful choice of chokes (including those in the anode, grid, and cathode leads) and by mounting valve clips right on to the end of the line condensers (making the line condensers integral with the ends of the line), the range can be extended down to 45 cms. at the expense of the other end of the range. With given fixed chokes a two to one wavelength range can be secured. Using special variable chokes, a full range of from 45–150 cms. can be secured. Using an "acorn" type triode, 360 volts H. T. can be used with a direct current battery feed of less than 2 milliamps. Super-regeneration adjustments remain practically constant from 50 cms. upwards, but become critical below 50 cms.

At ultra high frequency, where the decay time of oscillations is relatively small, the length of pulse produced is in the main controlled by the natural period of the pulse transformer and is approximately equal to this period. The frequency of repetition of the pulse is however substantially a function of the time constant of the resistance capacity blocking circuit. For instance, a pulse transformer that worked very satisfactorily had a natural frequency of 200 kc./s. and the repetition frequency was 15–50 kc.

An outstanding feature of all the circuits described was the ease with which it was possible to drive the pulse to relatively high peak powers. For instance, without straining the valve, and without reaching limiting conditions, it was found possible to drive an acorn type tube (using the grid blocking circuit) to a peak emission of over 600 milliamps corresponding to a peak power of 180 watts.

In experiments which we have made, modulation was (in the case of the grid blocking arrangement) effected by inserting a microphone transformer at the base of the grid resistance and directly modulating from an ordinary telephone microphone. Ample modulation, substantially frequency modulation of the pulse repetition frequency, was found to be obtained by this arrangement.

It is to be understood that for a receiver the oscillations do not (when the receiver is quiescent, that is, not receiving) build up to any appreciable strength, that is, they are incipient. The term oscillation generator is to be understood to cover such a case.

What is claimed is:

1. A radio frequency oscillation generator circuit for producing pulses of high frequency or of ultra high frequency oscillations comprising an electron discharge valve having electrodes including an anode, grid and cathode, the anode/cathode circuit of said electron discharge valve being back-coupled to the grid/cathode circuit by means including a transformer having one winding in the anode/cathode circuit of the valve and a tightly coupled second winding in the grid/cathode circuit of said valve, and a tuned radio-frequency circuit including an inductance and a condenser in parallel connected across the grid/anode space of the valve.

2. A radio frequency oscillation generator circuit for producing pulses of high frequency or of ultra high frequency oscillations comprising an electron discharge valve having electrodes including an anode, grid and cathode, the anode/cathode circuit of said electron discharge valve being back-coupled to the grid/cathode circuit by means including a transformer having one winding in the anode/cathode circuit of the valve and a tightly coupled second winding in the grid/cathode circuit of said valve, and a tuned radio frequency circuit, including parallel conductors terminated by a slider the position of which is adjustable, connected across the grid/anode space of the valve.

3. In a signaling apparatus, a high frequency generator including an electron discharge device having electrodes including an anode, grid and cathode; a transmission line coupled to the grid and anode for the production of high frequency oscillations; and apparatus to interrupt the generation of said oscillations at a pulse rate including a circuit of lower frequency regeneratively coupling said anode, cathode and control grid for the production of oscillations of said lower frequency.

4. In a signaling apparatus, a high frequency generator including an electron discharge device having electrodes including an anode, grid and cathode, means coupled to the grid and anode for the production of high frequency oscillations; and apparatus to interrupt the generation of said oscillations at a pulse rate including a circuit of lower frequency regeneratively coupling said anode, cathode and control grid for the production of oscillations of said lower frequency.

5. A radio frequency oscillation generator circuit for producing pulses of high frequency or of ultra high frequency oscillations comprising a source of anode potential, an electron discharge valve having electrodes including an anode, grid and cathode, the anode/cathode circuit of said valve being back-coupled to the grid/cathode circuit by means including an auto-transformer having one part of its winding in the anode/cathode circuit of said valve and a second part of its winding connected to said grid by means including a capacity and to the cathode by means including said capacity and a resistance, and a tuned radio frequency circuit, including parallel conductors terminated by a condenser the capacity of which is approximately equal to the anode/grid capacity of the valve, connected across the grid/anode space of the valve.

6. A radio frequency oscillation generator circuit for producing pulses of high frequency or of ultra high frequency oscillations comprising an electron discharge valve having electrodes including an anode, grid and cathode, the anode/cathode circuit of said valve being back-coupled to the grid/cathode circuit by means including a transformer having one winding in the anode/cathode circuit of the valve and a tightly coupled second winding in the grid/cathode circuit of said valve, said one winding being connected in series with a radio frequency choke between the positive terminal of a source of anode potential and the anode of the valve, said choke being next to the anode, a resistor and condenser connected in parallel with each other between the cathode of the valve and the negative terminal of said source of anode potential, and said second winding being connected in series with a second radio frequency choke between the grid of the valve and said network, said second choke being next to the grid.

7. A radio frequency oscillation generator circuit for producing pulses of high frequency or of ultra high frequency oscillations comprising an electron discharge valve having electrodes including an anode, grid and cathode, the anode/cathode circuit of said valve being back-coupled to the grid/cathode circuit by means including an auto-transformer having one part of its winding in the anode/cathode circuit of the valve, and a second part of its winding in the grid/cathode circuit of said valve, said one part being connected in series with a parallel connected resistor and condenser network between the negative terminal of a source of anode potential and the cathode of the valve, said network being next to the cathode, and said second part being connected in series with said network and a choke, between the grid and cathode of the valve, said choke being next to the grid.

8. A radio frequency oscillation generator circuit for producing pulses of high frequency or of ultra high frequency oscillations comprising an electron discharge valve having electrodes including an anode, cathode and grid, the anode/cathode circuit of said valve being back-coupled to the grid/cathode circuit by means including an auto-transformer having one part of its winding in the anode/cathode circuit of the valve and a second part of its winding connected to the grid by means including a capacity and the cathode means including said capacity and a resistor, said one part being connected in series with a radio frequency choke between the positive terminal of a source of anode potential and the anode of the valve, said choke being next to the anode, a second choke connected between the cathode of the valve and the negative terminal of said source of anode potential, said second part being connected in series with a series connected condenser and resistor between the said positive terminal and the negative terminal of said source of anode potential, said resistor being next to said negative terminal, and a second choke being connected between the junction point of said condenser with said resistor and the grid of the valve.

9. A radio frequency oscillation generator of high frequency or of ultra high frequency oscillations comprising an electron discharge valve having electrodes including an anode, grid and cathode, the anode/cathode circuit of said valve being back-coupled to the grid/cathode by means including an auto-transformer having its midpoint connected to the cathode of said valve by means including a parallel connected resistance capacity network, one of its ends connected to the grid and the other of its ends connected to the anode, one part of its winding connected across elements including the anode/cathode space of said valve and a second part of its winding in the grid/cathode circuit of the valve, said one part being connected in series with a radio frequency choke, condenser, and parallel connected resistance and condenser network, between the anode and cathode of the valve, the choke and first mentioned condenser being interposed between said one part and the anode with said choke next to the anode and the network being interposed between said one part and the cathode, said second part being connected in series with a second choke and said network between the grid of said valve and the cathode of said valve, said second choke being next to the grid and the network being connected between said second part and the cathode, and the series connected first choke, anode/cathode space of the valve, and network, being connected between the positive and negative terminals of a source of anode potential.

10. A generator as claimed in claim 9, wherein the cathode of the valve is connected through a third choke to the negative terminal of the said source of anode potential.

11. A generator as claimed in claim 9, wherein the cathode is connected to the said network through a third choke.

12. In a signaling apparatus, a high frequency generator including an electron discharge device having electrodes including an anode, grid and cathode, a resonant circuit element coupled to the grid and anode for the production of high frequency oscillations, and apparatus to interrupt the generation of said oscillations at a pulse rate including a circuit of lower frequency regeneratively coupling said anode, cathode and control grid for the production of oscillations of said lower frequency.

13. An oscillation generator circuit for producing pulses of high frequency current, including a thermionic valve having at least a cathode, a grid and an anode, a tuned line circuit comprising a pair of elongated conductors connected at one end to the anode and grid respectively of said valve and having a condenser connected across the ends remote from said valve, an autotransformer having one end of the winding thereof coupled to a point intermediate the ends of the elongated conductor connected to the anode of said valve, and a further condenser coupling the other end of said winding to the point on the other elongated conductor corresponding to the point on the first said conductor.

14. An oscillation generator circuit arrangement for producing pulses of high frequency oscillations, including a pair of thermionic valves each having a cathode, a grid and an anode, an inductance intercoupling the anodes, a radio frequency tuned network comprising a parallel connected inductance and condenser intercoupling the grids, an auto-transformer having a winding, a radio frequency choke intercoupling one end of said winding and the midpoint of the inductance intercoupling the anodes, a further condenser having one terminal connected to the other end of said winding, a resistor connecting the other terminal of said further condenser to the cathodes, and a further radio frequency choke interconnecting the other terminal of said further capacitor and the inductance of said tuned network.

15. An oscillation generator circuit for producing pulses of radio frequency current, including a thermionic valve having a cathode, a grid and an anode, a tuned radio frequency circuit comprising a pair of elongated parallel conductors and means interconnecting the conductors at points tuning the circuit to the desired radio frequency, means coupling the anode and the grid individually to the conductors at the end thereof remote from said interconnecting means, an auto-transformer having a winding coupled at one end thereof to said anode, a condenser coupling the other end of said winding to said grid, and a resistor having one terminal connected between said condenser and said grid and the other terminal coupled to said cathode.

16. In a signalling apparatus, a circuit arrangement for modulating and demodulating a train of radio frequency pulses, including a thermionic valve having an anode, a cathode and a grid, a resonant circuit coupled to the grid and anode for the production of high frequency oscillations, apparatus to interrupt the production of said oscillations at a pulse rate of lower frequency regeneratively coupling said anode, cathode and grid for the production of oscillations of said lower frequency, a resistance element, and a transformer having one winding in which the modulating wave appears and another winding interposed in the cathode/anode circuit of said valve in series with said resistance element.

17. A circuit arrangement for translating a train of radio frequency pulses, including an electron discharge device having a cathode, a grid and an anode, a resonant circuit coupled to the grid and the anode for the production of high frequency oscillations, means to interrupt the production of said oscillations at a pulse rate of lower frequency comprising an auto-transformer having a tapped winding, one end of said winding being coupled to said grid, a condenser coupling the other end of said winding to said anode, a parallel resistance and condenser network coupling the tapping of said winding to said cathode, and means to vary the amplitude of the pulses produced comprising a transformer having a primary winding to which the modulating wave is applied and a secondary winding, one end of said secondary winding being resistively coupled to said anode and the other end being resistively coupled to the tapping of said autotransformer winding.

18. A circuit arrangement for translating a train of radio frequency pulses, including an electron discharge device having a cathode, a grid and an anode, a resonant circuit coupled to the grid and the anode for the production of high frequency oscillations, means to interrupt the production of said oscillations at a pulse rate of lower frequency comprising an auto-transformer having a tapped winding, one end of said winding being coupled to said grid, a parallel resistance and condenser network coupling the tapping of said winding to said cathode, and means to vary the repetition rate of the pulses produced comprising a transformer having a primary winding to which the modulating wave is applied and a secondary winding, one end of said secondary winding being coupled to said anode and the other end being resistively coupled to the other end of said auto-transformer winding.

NOËL MEYER RUST.
GEORGE EARNSHAW PARTINGTON.
DONALD LEOPOLD PLAISTOWE.
DAVID JOHN FEWINGS.

REFERENCES CITED

The following references are of record in the file of this patent:

UNITED STATES PATENTS

| Number | Name | Date |
| --- | --- | --- |
| 1,966,616 | David | July 17, 1934 |
| 2,083,246 | Smiley | June 8, 1937 |
| 2,212,202 | Faudell | Aug. 20, 1940 |
| 2,409,577 | Matson | Oct. 15, 1946 |
| 2,412,710 | Bradley | Dec. 17, 1946 |